April 9, 1957    M. J. LOVELADY    2,788,173
COMPUTING INDICATORS
Filed Sept. 27, 1954
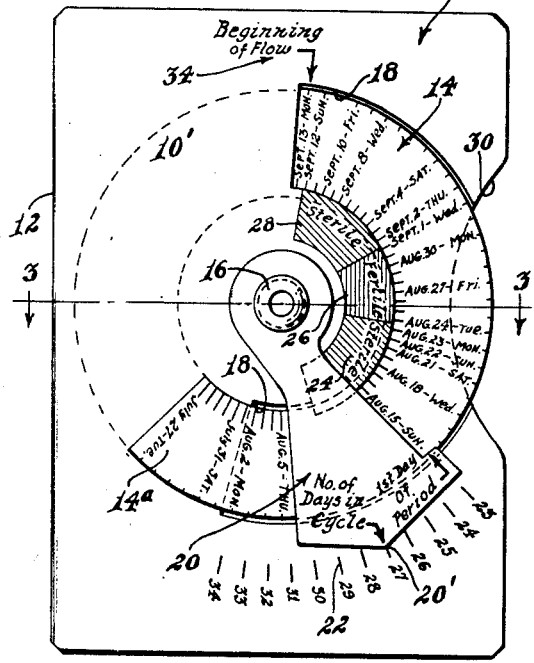
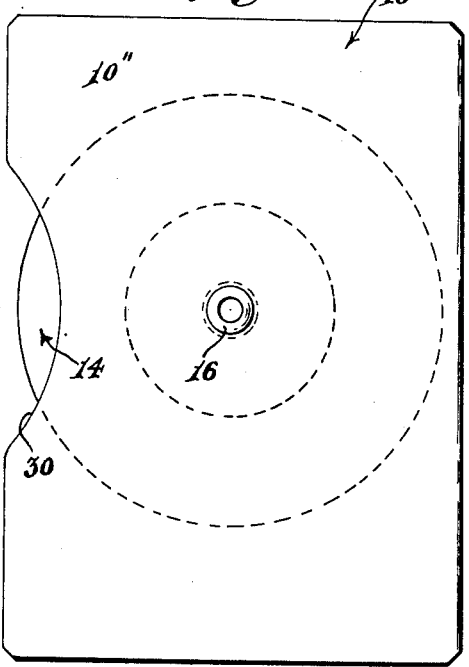
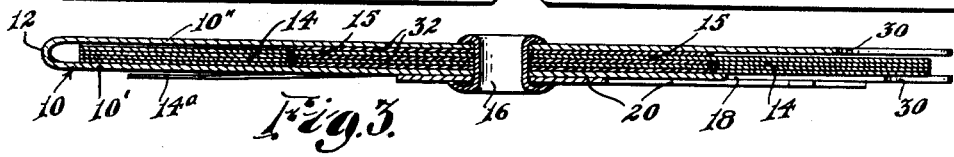
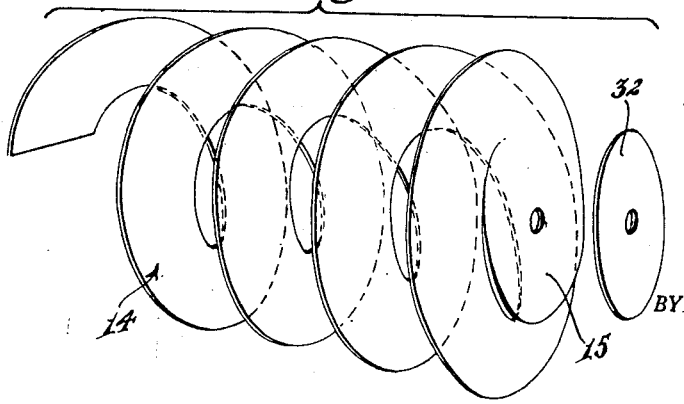
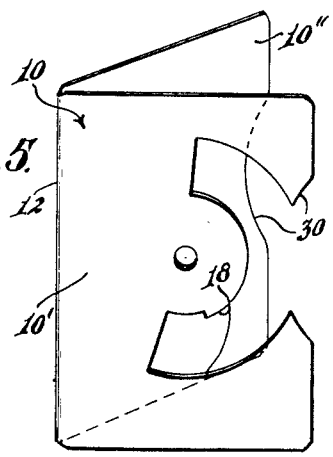
INVENTOR.
Maurice J. Lovelady
BY his atty.
John H. McKenna

United States Patent Office 2,788,173
Patented Apr. 9, 1957

2,788,173

COMPUTING INDICATORS

Maurice J. Lovelady, Newton, Mass.

Application September 27, 1954, Serial No. 458,452

5 Claims. (Cl. 235—67)

This invention relates to improvements in computing indicators of the general type wherein relatively movable elements may be moved relatively in a prescribed manner to give visual indication of computed information of a particular character. More particularly the invention provides a computing indicator wherein pivotally associated elements are relatively rotatable for cooperatively computing and visually indicating time periods such as the sterile and fertile periods in menstrual cycles. The particular embodiment of the invention as herein disclosed is designed specifically for computing and indicating particular periods in menstrual cycles although it should be understood that the features of novelty may be utilized to compute and visually indicate particular information of various sorts.

It is among the objects of the invention to provide a computing indicator which may be economically produced in generally a card form which conveniently may be carried in a pocket or a purse, and which is simple to operate.

Another object of the invention is to provide a computing indicator wherein consecutive data, such as consecutive periods of time, may be printed or otherwise applied to a flat spiral element of paper or the like, which is mounted on a support for manual rotation about the axis of the spiral to bring particular printed matter thereon into cooperating relation to indications on said support, each said manual rotation of the spiral element in one direction bringing an end portion thereof to a tear-off position at which used portions of the spiral element may be torn off and discarded.

Yet another object of the invention is to provide a menstrual period computing indicator wherein a generally flat spiral calendar is rotatably mounted on an indicating support and is adapted to be rotated clock-wise periodically to bring monthly time indications on the spiral element into registration with period indications on the support, in monthly succession, as predetermined by an adjustable indicator on the support for indicating the particular time indications of the spiral element which are to be brought into registration with the period indications on the support.

It is, moreover, my purpose and object generally to improve the structure and operative efficiency of computing indicators, and more particularly such indicators of a general type suitable for accurately computing and indicating the sterile and fertile periods in menstrual cycles.

In the accompanying drawings:

Fig. 1 is an elevational front face view of a computing indicator embodying features of the invention;

Fig. 2 is an elevational rear face view thereof;

Fig. 3 is a cross-sectional view on line 3—3 of Fig. 1 on a larger scale;

Fig. 4 is a view of the rotatable generally flat spiral calendar element, drawn out to show its relatively long flat spiral form, and including also a perspective view of one of the circular disks which are associated with the spiral element; and Fig. 5 is a perspective view, on a smaller scale, of the folded sheet element between the folds of which the spiral element is rotatably mounted.

Referring to the drawings, the disclosed computing indicator comprises a sheet element 10 of any suitable material which may be folded upon itself on the fold line indicated at 12 to provide two sheet portions 10', 10" between which a generally flat spiral element, indicated generally at 14, may be rotatably mounted by means of an eyelet 16, or the like, which secures together the sheet portions 10', 10" and the spiral element 14 and serves as an axis about which the spiral element 14 may be rotated. The sheet portion 10' is arcuately cut away at 18 to expose an adjacent arcuate surface portion of the spiral element 14.

An indicating pointer 20, or the like, is mounted upon the outer face of the sheet portion 10' and conveniently is secured by the eyelet 16. The pointer may be made of sheet material and has extent across the cut-out at 18 in sheet portion 10' in front of the exposed portion of the spiral element 14. Pointer 20 is manually adjustable about the axis of eyelet 16 to any of various positions along the cut-out at 18 and is frictionally maintained against accidental displacement.

The sheet portion 10' has printed, or otherwise marked thereon, an arcuate scale 22 with associated indications of various lengths of menstrual cycles in days. As shown, cycle lengths varying from twenty-three days through thirty-four days are indicated in clockwise succession along the scale 22, and the indicating pointer may be manually adjusted to set the point 20' of the pointer in register with any selected scale indication.

The spiral element 14, in the illustrated embodiment of the invention, is a spiral calendar of days, and the spiral ordinarily will have length for accommodating the three hundred sixty-five day indications for a complete year of use of the indicator, although spiral elements accommodating a greater or smaller number of day indications may be provided, if desired.

The sheet portion 10' has printed, or otherwise marked thereon, around the inner margin of the cut-out at 18, three arcuate regions 24, 26 and 28 of which the intermediate region 26 has arcuate extent for embracing a nine day period as indicated by the spiral calendar element 14. This intermediate region 26 represents the period of fertility in any menstrual cycle and may be labelled "Fertile" as shown. The region 24 has arcuate extent for embracing a fourteen day period as indicated by the spiral calendar element 14 and represents the longest period of sterility which may precede any fertile period in any menstrual cycle. The region 28 has arcuate extent for embracing an eleven day period as indicated by the spiral calendar element 14 and represents the period of sterility which follows the fertile period in any menstrual cycle. Each of the regions 24, 28 may be labelled "Sterile," as shown.

Conveniently, the period regions 24, 26, 28 may be colored to provide readily apparent color contrast. For example the region 26 may be red, and the two regions 24 and 28 may be green. The periods represented by the region 26 and 28 will register with nine and eleven day indications respectively for all menstrual cycles. However, the period represented by the region 24 will vary according to the location of the indicating pointer 20.

Referring more particularly to Fig. 4, the inner end of the generally flat spiral element 14 terminates in an integral disk portion 15 through which the securing eyelet 16 extends, and the element extends from the disk portion 15 in spiraled strip form having suitable length for accommodating thereon the desired number of day indications. The spiral element 14, when mounted between the sheet portions 10', 10" of folded sheet element 10 becomes compacted into a generally flat circular form which may be bodily rotated by gripping the peripheral portion thereof with the fingers, the sheet portions 10', 10" being suitably cut away at 30 to expose a peripheral margin of the spiral element.

Preferably, when the spiral element 14 is mounted, as best seen in Fig. 3, circular filler disks 32 are superimposed upon each other and upon the inner disk portion of the spiral element, for substantially filling the central space within the spiral so that the eyelet 16 may pass through these disks and the disk portion 15 of the spiral element, and through the sheet portions 10', 10" and the indicating pointer 20 and clamp all of these elements relatively tightly together to provide needed frictional resistance for holding relatively adjustable parts in selected positions of adjustment. However, the disk portion 15 of the spiral element 14 can rotate with the spiral element. Usually, another disk 32 will be provided between the disk portion 15 of spiral element 14 and the sheet portion 10", to facilitate rotation of disk portion 15.

When the spiral element 14 is rotated clockwise, the outer end portion of the spiral strip will pass under the indicating pointer 20 and, as clockwise rotation is continued, the end portion will be projected beyond the pointer and this projecting portion, indicated at 14a in Fig. 1, may be torn off and discarded, using the adjacent edge of indicating pointer 20 along which the tearing readily may be effected. However, even if the projecting end portion 14a is not promptly torn off, it will be moved clockwise with further clockwise rotation of element 14 and, beyond the adjacent end of the cut-out at 18, will be exteriorly of sheet portion 10' and readily available to be torn off and discarded at any convenient time before it reaches the opposite end of the cut-out at 18.

In use of the indicator for computing and indicating the periods of fertility and sterility in a menstrual cycle for any particular time during any year, the indicating pointer 20 will be adjusted along scale 22 into registration with the scale indication representing the length in days of the particular individual's menstrual cycle, such as the twenty-seven day scale indication with which the pointer 20 is in register in Fig. 1. Assuming that the menstrual cycle with which the particular individual is concerned started, or will start, on August 15, the spiral element 14 will be rotated to bring this August 15 indication into exposed position immediately adjacent to the right-hand edge of the indicating pointer 20, as shown in Fig. 1. The days of fertility in the particular menstrual cycle then will be indicated on the spiral element 14 opposite the region 26 which represents the fertile period on sheet portion 10'. Similarly, the days of sterility in the same menstrual cycle will be indicated on the spiral element 14 opposite the region 28 and opposite the exposed portion of the region 24 which represent the sterile periods on sheet portion 10'. As represented in Fig. 1, the days of fertility are indicated to be August 24 to September 1, inclusive, and the days of sterility are indicated to be August 15 to August 23, inclusive, and September 2 to September 12, inclusive. The September 13 indication on the spiral element 14, in Fig. 1, will be indicated as the date of beginning of flow in the next following menstrual cycle as designated on the sheet portion 10' at 34.

The spiral calendar element 14 is represented in the drawing as a continuously smooth strip extending spirally from the integral central disk portion 15. Actually the spiral element 14 preferably will be made up of a series of similar generally circular elements which may be stamped from sheet stock in flat ring form. A relatively small segment of each ring is cut away to provide a gap in the annular extent thereof so that an end of one ring may be lapped a little over an end of a next adjacent ring and be secured thereto by adhesive or any other suitable securing means. All of the rings may be thus secured together to provide a spiral calendar element 14 of the desired length and the joints become distributed around the circle of the spiral. The central integral disk portion 15, as shown in Fig. 4, may, if desired be completely severed from the spiral to constitute one of the filler disks 32, in which case the spiral element 14 may be entirely removed from the sheet portions 10', 10" by rotating it clockwise until its inner end clears the arcuate cut-out at 18.

The filler disks 32 may be the circular disks removed from the centers of the rings during the process of stamping out the rings which ultimately make up the spiral element.

My improved computing indicator is convenient to carry, simple to operate, and accurate in use. Obviously, various changes in the details of construction may be made, as well as changes in the character of the material associated therewith as a basis for computation and indication. Hence, it is intended that the patent shall cover, by suitable expression in the appended claims, whatever features of patentable novelty exist in the invention disclosed.

I claim as my invention:

1. A computing indicator comprising two sheet elements of which one is arranged in front of the other and has an arcuate cut-out therein, a strip-form spiral indicator arranged between said sheet elements, pivot means extending axially of the spiral of said indicator and securing said sheet elements together with said spiral indicator in compacted generally flat condition and rotatable between and relative to said sheet elements about the axis of said pivot means, said spiral indicator having indications thereon distributed along a substantial portion of its length, and said arcuate cut-out in said one sheet element being located and adapted to expose the said indications on a portion of the outer convolution of the spiral indicator, the strip-form convolution of said spiral indicator which at any time has indications exposed at said cut-out having its outer end and opposite side edges free of any direct connection to adjacent elements whereby said outer free end portion of said convolution may, by rotation of the indicator, be projected out of said cut-out in condition to be removed from an adjacent portion of said spiral indicator, means providing a plurality of defined arcuate zones on said one sheet element along a margin of said arcuate cut-out whereby said arcuate zones and the exposed indications on said spiral indicator which at any time are opposite the said zones combine to provide particular information, and guide means at a margin of said cut-out for determining which indications of the spiral indicator will be opposite said zones when any particular indication of the spiral indicator is associated with said guide means.

2. A computing indicator comprising two sheet elements of which one is arranged in front of the other and has an arcuate cut-out therein, a strip-form spiral indicator arranged between said sheet elements, pivot means extending axially of the spiral of said indicator and securing said sheet elements together with said spiral indicator in compacted generally flat condition and rotatable between and relative to said sheet elements about the axis of said pivot means, said spiral indicator having indications thereon distributed along a substantial portion of its length, and said arcuate cut-out in said one sheet element being located and adapted to expose the said indications on a portion of the outer convolution of the spiral indicator, the strip-form convolution of said spiral indicator which at any time has indications exposed at said cut-out having its outer end and opposite side edges free of any direct connection to adjacent elements whereby the outer end portion of the spiral strip of the indicator becomes projected out of said cut-out at one end of the latter when said spiral indicator is rotated in direction to move said outer end of the spiral strip along said cut-out toward said one end of the cut-out, whereby said projected end portion of the spiral strip may be removed from the spiral indicator, means on said one sheet element defining a plurality of arcuate zones along a margin of said cut-out, and guide means at a different location along a margin of said cut-out for guiding a setting of said spiral indicator with a predetermined indication of the spiral indicator associated with said guide means thereby to dispose other indications on the spiral indcator opposite said arcuate zones for indicating, in conjunction with said zones, particular computed information.

3. A menstrual cycle computing indicator comprising a strip-form spiral calendar having the days of a plurality of months indicated thereon in progressive succession with the earlier days at the outer end of the spiral strip, a sheet element supporting said spiral calendar with the outer convolution of the spiral strip disposed adjacent to the rear face of said sheet element and with the outer end and opposite side edges of said outer convolution free of any direct connection to adjacent elements, means securing said calendar rotatably to the sheet element with the calendar rotatable about the axis of the spiral of the calendar, means providing an opening in said sheet element having arcuate extent around said axis, whereby day indications on said outer convolution of the spiral strip are exposed at said arcuate opening and said outer end portion of said outer convolution is free to be projected out of said opening in condition to be removed from said spiral strip, means on said sheet element defining a plurality of arcuate zones along a margin of said arcuate opening, and a guide element with which a predetermined day indication of the calendar may be associated by rotation of the calendar, thereby to determine particular day indications of the calendar which will be exposed opposite each of said plurality of arcuate zones.

4. A menstrual cycle computing indicator comprising a strip-form spiral calendar having the days of a plurality of months indicated thereon in progressive succession with the earlier days at the outer end of the spiral strip, a sheet element supporting said spiral calendar with the outer convolution of the spiral strip disposed adjacent to the rear face of said sheet element, means securing said calendar rotatably to the sheet element with the calendar rotatable about the axis of the spiral of the calendar, said outer convolution of the spiral strip having its outer end and opposite side edges free of any direct connection to adjacent elements, means providing an opening in said sheet element having arcuate extent around said axis, whereby day indications on said outer convolution of the spiral strip are exposed at said arcuate opening and said outer end portion of said outer convolution may be projected out of said opening in condition to be removed from the spiral strip, means on said sheet element defining arcuate zones along a margin of said arcuate opening, one of said arcuate zones representing the period of fertility in a menstrual cycle, and another of said arcuate zones representing a period of sterility in the same menstrual cycle, means on said sheet element providing a series of fixed indications along a margin of said arcuate opening, each indicative of a length of a menstrual cycle in days, a pivotally mounted member movable about said axis into registration with any selected one of said series of indications on said sheet element, said pivotally mounted member having guide means thereon for guiding the setting of a particular day indication of the calendar in association with said guide means, thereby to locate other particular day indications of the calendar opposite said arcuate zones representing fertile and sterile periods respectively of a menstrual cycle beginning on the day of the calendar indication which has been associated with said guide means.

5. A menstrual cycle computing indicator comprising a strip-form spiral calendar having the days of a plurality of months indicated thereon in progressive succession with the earlier days at the outer end of the spiral strip, a sheet element supporting said spiral calendar with the outer convolution of the spiral strip disposed adjacent to the rear face of said sheet element, means securing said calendar rotatably to the sheet element with the calendar rotatable about the axis of the spiral of the calendar, said outer convolution of the spiral strip having its outer end and opposite side edges free of any direct connection to adjacent elements, means providing an opening in said sheet element having arcuate extent around said axis whereby day indications on said outer convolution of the spiral strip are exposed at said arcuate opening and said outer end portion of said outer convolution may be projected out of said opening in condition to be removed from the spiral strip, means on said sheet element defining three adjacent arcuate zones arranged along a margin of said arcuate opening, one of said arcuate zones being between the other two and representing the period of fertility in a menstrual cycle, and the other said arcuate zones representing sterile periods respectively preceding and following the fertile period in a menstrual cycle, a selector indicator pivotally mounted on said sheet element and movable to increase or decrease the extent along said arcuate opening of said arcuate zone representing the sterile period preceding the fertile period in a said cycle as determined by the length of a said cycle for a particular individual, said indicator having guide means thereon for guiding the setting of the calendar indication for the day of beginning of a said cycle, thereby to dispose particular day indications of the calendar opposite each of said arcuate zones on said sheet element, the outer end portion of said spiral strip being projected out of said arcuate opening with continued rotation of the calendar in one direction thereby making this projected used portion of the calendar available to be removed from the calendar.

References Cited in the file of this patent

UNITED STATES PATENTS

| 1,539,868 | Roberts | June 2, 1925 |
| 1,940,177 | Meagher | Dec. 19, 1933 |
| 2,532,819 | Morse | Dec. 5, 1950 |

FOREIGN PATENTS

| 96,687 | Switzerland | Nov. 16, 1922 |